(12) United States Patent
Kabanov et al.

(10) Patent No.: US 8,539,282 B1
(45) Date of Patent: Sep. 17, 2013

(54) MANAGING QUALITY TESTING

(75) Inventors: Alexey Kabanov, Andreapol (RU); Artem Zarafyants, St. Petersburg (RU); Andreas L. Bauer, Boxborough, MA (US); Ivan Gumenyuk, St. Petersburg (RU); George J. Grosner, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 210 days.

(21) Appl. No.: 12/495,468

(22) Filed: Jun. 30, 2009

(51) Int. Cl.
*G06F 11/00* (2006.01)

(52) U.S. Cl.
USPC ............................ 714/38.1; 702/182; 717/124

(58) Field of Classification Search
USPC ............ 714/38.1, 38.11, 38.12, 38.13, 38.14, 714/47.1, 47.2, 47.3; 717/124–135; 702/81, 702/84, 182, 183
See application file for complete search history.

(56) References Cited

U.S. PATENT DOCUMENTS

| | | | |
|---|---|---|---|
| 7,747,987 B1* | 6/2010 | Akarte et al. | 717/131 |
| 2004/0154001 A1* | 8/2004 | Haghighat et al. | 717/130 |
| 2005/0183070 A1* | 8/2005 | Alexander et al. | 717/133 |
| 2007/0006041 A1* | 1/2007 | Brunswig et al. | 714/38 |
| 2007/0174023 A1* | 7/2007 | Bassin et al. | 702/186 |
| 2007/0174713 A1* | 7/2007 | Rossi et al. | 714/38 |
| 2009/0144698 A1* | 6/2009 | Fanning et al. | 717/120 |
| 2009/0228316 A1* | 9/2009 | Foley et al. | 705/7 |

* cited by examiner

*Primary Examiner* — Scott Baderman
*Assistant Examiner* — Joseph Kudirka
(74) *Attorney, Agent, or Firm* — Krishnendu Gupta; Jason A. Reyes; Deepika Bhayana

(57) ABSTRACT

A method is used in managing quality testing. Quality tests are mapped to characteristics of a product under test. Based on the mapping and a result of a previously executed quality test, a respective relevance level is determined for each of the quality tests. Based on the relevance levels, a priority is determined among the quality tests.

18 Claims, 5 Drawing Sheets

| | Weight (%) | ID | Tags |
|---|---|---|---|
| Flare | | artf1000 | |
|   LUN_Bind | (100) | artf1001 | Keywords: bind<br>CLI: bind, b, b -all |
|     Fast_Bind | 20 | artf1002 | Keywords: bind, zero disk<br>CLI: bind, b, zero_disk, zd |
|     Bind | 80 | artf1003 | Keywords: bind<br>CLI: b, b -all, bind, bind -all |
|   LUN_Unbind | | artf1004 | Keywords: wipe, unbind<br>CLI: unbind, ub |
|   LUN_Trespass | (100) | artf1005 | |
|     Trespass | 65 | artf1006 | CLI: tr, trespass<br>RegExp: /\s*(tr \| trespass)\s+\d+/gi |
|     Auto_Trespass | 20 | artf1007 | Keywords: auto-trespass<br>CLI: ls, lustat |
|     Auto_Assign | 15 | artf1008 | Keywords: auto-assign<br>CLI: setunit, su |
|   BG_Process | (100) | artf1009 | |
|     BG_Verify | 30 | artf1010 | Keywords: BG verify, background verify, BGV<br>CLI: setverify, setverify -bve, setverify -bvp |
|     BG_Zeroing | 40 | artf1011 | Keywords: BG zeroing, zeroing, BZR<br>CLI: setunit, setdisk |
|     Sniffing | 30 | artf1012 | Keywords: sniffing, BG sniffing, sniff verify<br>CLI: setverify -sne, setverify |

| | Weight (%) | ID | Tags |
|---|---|---|---|
| Flare | | | |
| LUN_Bind | (100) | artf1000 | |
| Fast_Bind | 20 | artf1001 | Keywords: bind<br>CLI: bind, b, b-all |
| Bind | 80 | artf1002 | Keywords: bind, zero disk<br>CLI: bind, b, zero_disk, zd |
| LUN_Unbind | | artf1003 | Keywords: bind<br>CLI: b, b-all, bind, bind-all |
| | | artf1004 | Keywords: wipe, unbind<br>CLI: unbind, ub |
| LUN_Trespass | (100) | artf1005 | CLI: tr, trespass<br>RegExp: /\s*(tr \| trespass)\s+ld+/gi |
| Trespass | 65 | | |
| Auto_Trespass | 20 | artf1006 | Keywords: auto-trespass<br>CLI: ls, lustat |
| Auto_Assign | 15 | artf1007 | Keywords: auto-assign<br>CLI: setunit, su |
| BG_Process | (100) | artf1008 | |
| BG_Verify | 30 | artf1009 | |
| | | artf1010 | Keywords: BG verify, background verify, BGV<br>CLI: setverify, setverify -bve, setverify -bvp |
| BG_Zeroing | 40 | artf1011 | Keywords: BG zeroing, zeroing, BZR<br>CLI: setunit, setdisk |
| Sniffing | 30 | artf1012 | Keywords: sniffing, BG sniffing, sniff verify<br>CLI: setverify -sne, setverify |

FIG. 5

MANAGING QUALITY TESTING

BACKGROUND

1. Technical Field

This application relates to managing quality testing.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

A host system including a host processor may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Tools are used for setting up tests for and measuring the performance of multi-device systems, such as a data storage system. As the size and complexity of computer systems increase, including both the number of host computers and the number and size of the disk drive elements, it becomes increasingly important to measure and understand the functions and parameters which affect or limit the performance of the system. The performance of the mass storage system can be typically measured in terms of input/output (I/O) response times, that is, the time it takes for a read or write command to be acted upon, as far as the host computer is concerned, by the disk drive controller system.

It is well known, in the field, to measure, usually using a single parameter, the instantaneous or average response time of the storage system. Typically, a host computer outputs one or more I/O requests to the disk drive controller, and then measures the time for a response to be received from the disk drive controller.

The performance of a large system, for example a large data storage system, is particularly difficult to measure. For example, more than one of the host computers, which connect to the disk drive controller(s), can operate at the same time, in a serial or in a parallel fashion. As a result, a plurality of disk drive elements, usually arranged in a disk drive array, operating in either an independent fashion, a RAID configuration, or a mirrored configuration, for example, can have a significant yet undetectable bandwidth or operational problem which cannot be addressed, or discovered, when commands are sent only from a single host computer.

When running the performance tests on a data storage system, one is usually interested in determining the maximum performance of components of the system, such as a host adaptor or SCSI adaptor (SA), a host adaptor port, a disk adaptor (or DA) etc., as well as the performance of the entire system.

A complex computing system such as a data storage system is typically the product of a large software development environment that relies on many developers, or software engineers, developing systems including many software elements. Each software element includes multiple objects, and is spread across many files. Typically, the files include source code, or human readable versions, of computer instructions, and are modifiable by the developers. As is known in the industry, the source code is compiled into object code and eventually into executable code, which is a set of instructions executable by a processor on the target machine for which the system was developed. The process of transforming the source code to the executable (running) system is known as a build, and involves a series of transformations from source code to executable code.

Software objects in conventional software systems include or inherit methods and attributes from other objects in the system. Inheritance is usually defined in terms of classes, which inherit other classes (or subclasses), resulting in a complex hierarchical or matrix pattern of inheritance, often called an inheritance lattice. Inheritance results in a dependency between the objects or classes, as changes to a particular class triggers a need to propagate the change to classes which inherit, or depend on, the changed class. Such dependencies are resolved by a build, which recompiles the affected entities to propagate the changes to dependent classes. In a large software system, the build can become substantial, and a modification to a particular class or object can have a rippling effect which traverses the inheritance lattice defined by the dependencies.

Computer programs often undergo several modification, development and improvement efforts. These development efforts may involve the modification of a program to improve its functionality and reduction or elimination of redundant variables and/or functions. Some of these development activities may involve the addition or removal of symbols and functions and the redefinition of factors. These development activities may or may not lead to functional changes in the compiled source code file and or header files of a program. Development activities that do not bring about any functional change in the compiled code may include removal of dead codes, restructuring header files, movement of functions from one file to another and creating self-compilable header files.

Customarily in the software development environment, multiple developers collaborate when writing source code. When collaborating, different developers independently work on separate modules or portions of the source code file. Source code management systems facilitate the collaborative authoring process by different developers. In most source code management systems, developers check-out a file or module, make changes, and check the file or module back into the source code management system. The newly checked-in file or module is assigned a version number, and that version is associated with an author. In addition to tracking the version number and author as part of the source code management system, the file or module may have additional metadata containing version and author information.

While working on a portion of source code, a developer may have questions regarding code written or changed by another developer in an earlier version of the code. It may be beneficial for developers to be able to identify the individual who introduced, modified, or deleted a specific portion of code in the current or a previous version of the source code. Most source code management systems provide some level of version control that indicates dates, times, and the author responsible for creating or modifying a version. Some source code management systems track changes by line, some track by module, and some source code management systems do not track changes at all.

The source code for software projects of all kinds (commercial, private, academic, governmental, open source, etc.) is routinely, universally, kept in specialized source code databases or repositories. Source code is represented as text files. Major software projects can have many thousands of such files, and scores of programmers making changes to various ones of these files. The primary purpose of source code repositories is to control and track changes to the source code and related (e.g., build, XML, configuration, documentation, test data, etc.) files. Various code control repositories are in widespread use (e.g. RCS (Revision Control System), SCCS (Source Code Control System), CVS (Concurrent Versions System), Subversion, CMVC (Configuration Management Version Control), Rational's ClearCase, Microsoft's Visual SourceSafe, etc.).

In general, as software applications have become increasingly complex, software development tools have been created to assist in the development of such applications. One such development tool, known as an integrated development environment ("IDE"), can assist the developer in understanding the structure, the dependencies, and the flow of complex applications. Examples of IDEs include Tornado® and SNiFF®, both available from Wind River Systems, Inc., as well as Visual C++®, available from Microsoft, C-Forge® available from CodeForge, VisualAge®, available from IBM, Jbuilder®, available from Borland, and SlickEdit®, available from MicroEdge.

In particular, software applications typically consist of many different files of source code that are then "built" together into a single application. Thus, development of software applications often involves developing these distinct source code files and revising those files over time. With complex software applications involving a high number of files, or in software development projects using multiple team members—or multiple teams—controlling access to those files and managing their development can be a very elaborate and complicated task.

Most IDEs in use today include some type of version control functionality coded into the IDE itself. Alternatively, some IDEs have been designed to function together with one specific version control tool. In those cases an adapter program provides an interface between the IDE and the separately coded version control tool. At least one IDE (SNiFF® version 3.0, available from Wind River) is compatible with several different version control tools. In SNiFF® version 3.0, the communication between the IDE and the version control tool is accomplished using various version control adapters, one for each version control tool supported by the IDE. Each version control adapter used with SNiFF® version 3.0 includes scripts that map the version control commands available in the SNiFF® menus with the corresponding version control commands of the version control tool to which it is adapted. The user dialogues, graphic user interface, and many of the version control and configuration management functions are performed by the IDE program itself. The version control adapters are relatively simple script files and are unable to make any but the simplest of decisions. Instead, the version control adapters act merely to dispatch commands and information between the IDE to the version control tool.

To date, at least several version control tools have been developed specifically to assist the software developer in controlling and managing revision information for each source code file. Version control is the process of managing and administering file revisions. CVS is an example of such version control tools. These version control tools help to manage multiple revisions of source code files by keeping a complete history of changes performed to the files. They allow the user to track changes made to the files and to return to a previous revision of a file. They may also keep track of who performed the revisions and when, and can "lock" a file to prevent two users from revising the file simultaneously. Typically, files are located in a repository that is directly accessed by the version control tool. As mentioned above, the file may be "checked out" of the repository by a developer, and changes may then be made to the file before it is checked back in. While the file is checked out in a locked state, other members of the development team may not make changes to it. When the file is checked back in it becomes accessible again to other members of the team, and the version control tool helps manage information about who checked out the document, when, and what changes were made. The tool may allow for the developer to save comments describing his changes and may assign a new name or version number to the file. Most of the version control tools offer these basic features in addition to other more advanced features.

Issue tracking systems and issue tracking databases are used to record and track both tasks that need to be completed for a project as well as open bugs and issues. Common examples of these systems include, but need not be limited to, Bugzilla and Team Track.

There are many well-known approaches to automated testing during the development of a software program or system. During the feature/test development phase, for example, a quality assurance (QA) engineer may devise a series of static test cases against which a system under development may be exercised. A set or collection of test cases is sometimes referred to a test suite.

In general, in order to help ensure the quality of software applications, quality assurance engineers use a variety of tools and procedures. For example, if an application has been modified, QA engineers test the application in order to ensure that additional bugs have not been introduced. Automated testing tools that perform regression testing are typically used to test the quality of a software application. WinRunner, by Mercury Interactive, is an example of an automated testing tool.

Regression testing is a quality control measure to ensure that newly modified code still complies with its specified requirements and that unmodified code has not been affected by any modifications. Regression testing is often used to the selectively retest a software application that has been modified to ensure that any bugs have been fixed. Furthermore, regression testing can be used to ensure that no other previously-working functions have failed as a result of the reparations and that newly added features have not created problems with previous versions of the software.

More particularly, regression testing is a way of testing software where the test verifies that the functionality of the software that worked previously continues to work. One form that regression testing takes is for the software to be executed and output collected from the software. The output is saved as the regression control. At a later point (often repeated at regular intervals), the software is executed again and further output collected. This second output is then compared to the regression control. If the comparison reveals differences between the second output and the regression control, a regression has been found. Subsequently, the tester has to determine whether that difference was due to an acceptable change in the software or whether an error was introduced.

SUMMARY OF THE INVENTION

A method is used in managing quality testing. Quality tests are mapped to characteristics of a product under test. Based on the mapping and a result of a previously executed quality test, a respective relevance level is determined for each of the quality tests. Based on the relevance levels, a priority is determined among the quality tests.

BRIEF DESCRIPTION OF THE DRAWINGS

Features and advantages of the present invention will become more apparent from the following detailed description of exemplary embodiments thereof taken in conjunction with the accompanying drawings in which:

FIG. 5 is an illustration of test related information that may be used with one or more of the techniques described herein.

DETAILED DESCRIPTION OF EMBODIMENT(S)

As described in more detail below, a quality testing management technique is provided that may be used for automatic selection of tests, e.g., regression tests for a software product based on a test analyzer and a process of tracking code changes by features.

In an example, to help assure product quality, a large number of tests may be used to verify different aspects of an evolving software product, but a typical running cycle of all these tests may take weeks, and development teams deliver new pieces of functionality every day.

However, in accordance with the quality testing management technique, it is possible to select highly appropriate or relevant tests for daily regression execution to improve the utility of such tests, e.g., nightly tests. In at least one implementation, automatic selection of tests for daily testing is based of their daily calculated relevance, and the implementation includes grouping tests by features, automatic analysis of code of test scripts (e.g., containing command line interface (CLI) calls or other user interface commands), assigning development changes with artifacts (i.e., defect or bug reports) that are also grouped by features, and test cases that do not cover changes are rotated nightly. (In at least one other implementation, test cases that cover changes are rotated nightly.)

Conventionally, with execution of only the full test suite, the duration of the full test cycle grows as new tests are added, changes made by developers are not tested until a new cycle starts and finishes, and unguided manual selection of tests for daily execution can be time consuming and error prone.

By contrast, at least some implementations of the quality testing management technique provided decreased time-to-market, and improved performance of fixing software bugs. In particular, daily tests, especially when they are most relevant and automatically selected, have an improved turn-around time of feedback to developers under the quality testing management technique (conventionally, if a bug is found when developers are already actively working on other features, it takes much more time to fix, because it requires bringing the old feature to their attention). In one or more implementations of the quality testing management technique, automatic selection may be based on a formula in a spreadsheet, an analysis of test scripts may be based on mapping CLI syntax (commands and options) to features, and tests and source code changes may be grouped by user-visible features, which can help focus developers on value for the customers.

Figure 1:
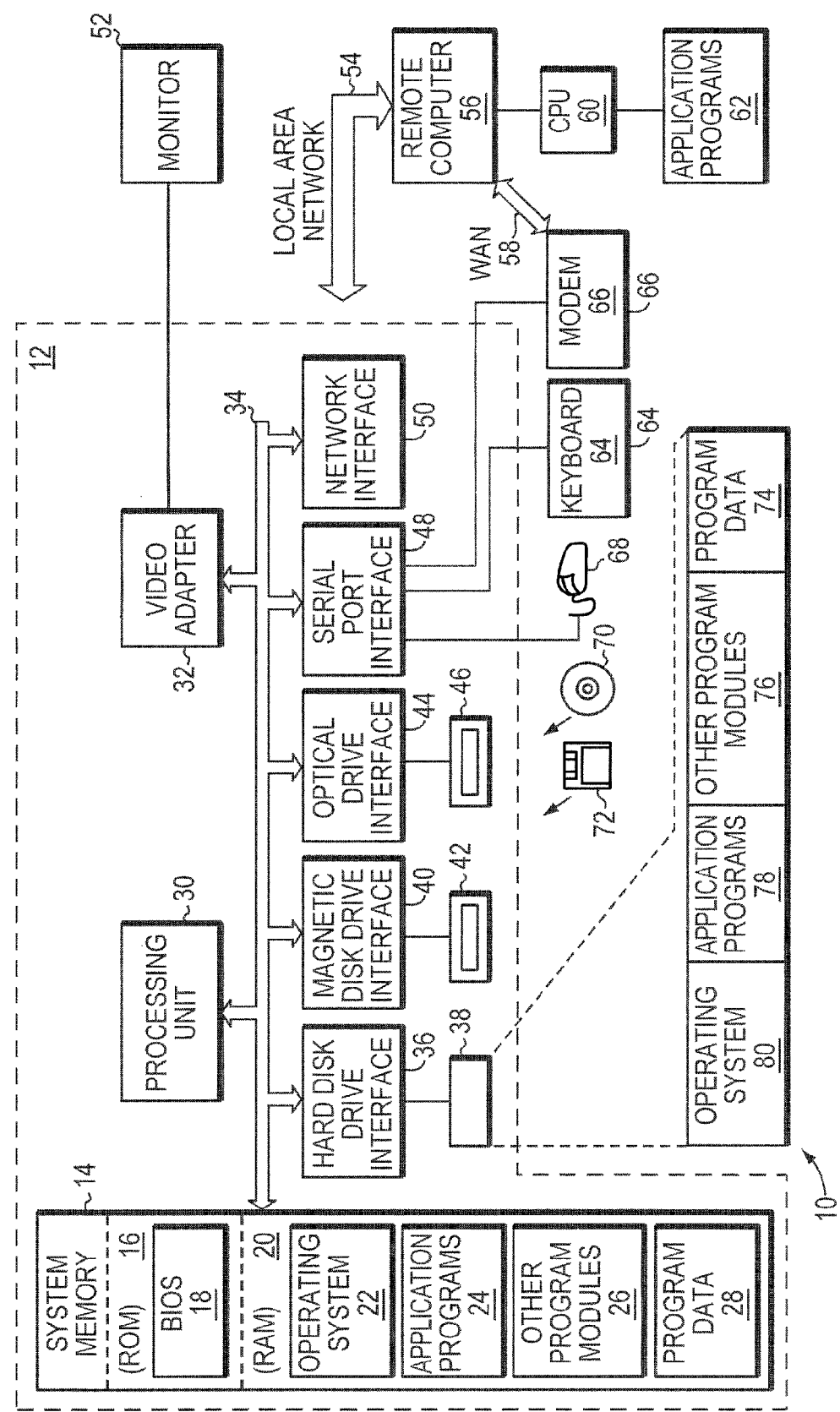
FIGS. 1-2, 4 are block diagrams of systems that may be used with one or more of the techniques described herein.

FIG. 1 and the associated description represent an example of a suitable computing environment ("environment") for use with at least some aspects of the quality testing management technique ("technique"). While the technique will be described in the general context of computer-executable instruction of a computer program that runs on a personal computer, the technique can also be implemented in combination with other program modules.

Generally, program modules include routines, programs, components, data structures and the like that perform particular tasks or implement particular abstract data types. Further, the technique can also be implemented using other computer system configurations, including hand-held devices, multi-processor systems, microprocessor-based or programmable consumer electronics, minicomputers, mainframe computers, and distributed computing environments where program modules may be located in both local and remote memory storage devices.

With reference to FIG. 1, the environment may be implemented within a general purpose computing device in the form of a conventional personal computer 12, including a processing unit 30, a system memory 14, and a system bus 34 that couples various system components including the system memory 14 to the processing unit 30. The system memory 14 includes read only memory (ROM) 16 and random access memory (RAM) 20.

A basic input/output system 18 (BIOS), containing the basic routines that help to transfer information between elements within the personal computer 12 (e.g., during start-up) is stored in ROM 16. The personal computer 12 further includes a hard disk drive 38 for reading from and writing to a hard disk (not shown), a magnetic disk drive 42 for reading from or writing to a removable magnetic disk 72, and an optical disk drive 46 for reading from or writing to a removable optical disk 70 such as a CD ROM or other optical media, all of which are connected to the system bus 34 by respective interfaces 36, 40, 44.

The drives and their associated computer-readable media provide nonvolatile storage of computer readable instructions, data structures, program modules and other data for the personal computer 12. Although the exemplary environment described herein employs certain disks, it should be appreciated by those skilled in the art that other types of computer readable media for storing data may also be employed.

A number of program modules may be stored on the disks 72, 70, ROM 16 or RAM 20, including an operating system 22, one or more application programs 24, other program modules 76, and program data 74. Commands and information may be entered into the personal computer 12 through input devices (e.g., a keyboard 64, pointing device 68, a microphone, joystick, etc.). These input devices may be connected to the processing unit 30 through a serial port interface 48, a parallel port, game port or a universal serial bus (USB). A monitor 52 or other type of display device is also connected to the system bus 34 via an interface, such as a video adapter 32.

The personal computer 12 may operate in a networked environment using logical connections to one or more remote computers 56, such as another personal computer, a server, a router, a network PC, a peer device or other common network node. The logical connections depicted in FIG. 1 include a local area network (LAN) 54 and a wide area network (WAN) 58. Such networking environments are commonplace in offices, enterprise-wide computer networks, intranets and the Internet.

When used in a LAN networking environment, the personal computer 12 is connected to the local network 54 through a network interface or adapter 50. When used in a WAN networking environment, the personal computer 12 typically includes a modem 66 connected to the system bus 34 via the serial port interface 48 or other means for establishing a communications over the wide area network 58, such as the Internet. The operations of the technique may be distributed between the two computers 12, 56, such that one acts as a server and the other as a client (see FIG. 2). Operations of the technique for each computer 12, 56 (client and server) may be stored in RAM 20 of each computer 12, 56 as application programs 24, other program modules 26, or on one of the disks 38, 42, 46. It will be appreciated that the network connections shown are exemplary and other means of establishing a communications link between the computers may be used.

At least four major components are involved in the process of testing software: reliability testing, functionality testing, application performance testing and system performance testing.

Reliability testing involves detecting run-time errors and memory leaks before they occur and precisely identifying their origin. Error detection is not limited only to applications for which source code is available. For example, application can often include third-party components that require testing. Reliability tools should work within an integrated development environment (IDE) to facilitate their use by developers as well as testing professionals. A reliability testing process should also be repeatable such that once a problem has been discovered there is a method of repeating the steps to reproduce the error. This assists in accelerating the implementation of the fix and is indispensable for follow-up tests after the repair has been made.

A purpose of functional testing is to help ensure that the application meets the requirements established for it. For example, testing the functionality of an order entry system would include verifying that the right products were shipped, that the right account was billed, and that credit limits were checked appropriately. Typically, a testing professional builds regression tests by exercising the application as a tool records keyboard and mouse events. The testing professional inserts validation points during the recording stage to ensure that the application is generating the required results. The product of the recording session is generally a reusable script that can then be played back many times to test the application as it progresses through the development to release. Typically such tools support major Enterprise Resource Planning (ERP) environments.

Application performance testing (APT) occurs after a particular feature is operating reliably and correctly. For example, an online order entry system that requires several minutes to check credit limits is clearly unacceptable. Application performance testing should determine exactly why a particular software component is slow by pinpointing the performance bottlenecks. The APT needs to identify where the software is spending its time, and why any specific function is particularly slow. Further, APT should expose purchased components that are not meeting performance specifications and ascertain which system calls, if any, are causing performance problems.

System performance testing is the process of exercising a system by emulating actual users in order to assess the quality, scalability, and performance of the system in a production environment. Typically, an important attribute exposed by system performance testing is the breaking point of the system. This is the point at which the system performance has become unacceptably slow, when the system begins to produce incorrect results, or when the system crashes altogether. System performance testing is a predictive activity. For the results to be meaningful, it is important that the prediction be an accurate reflection of system behavior under production load. To achieve a realistic workload the following considerations must be made: (a) realistic mix of test data for each transaction type; (b) realistic mix of transaction types and user activities; (c) pacing of the test execution must reflect the packing of real user activity; and (d) server responses must be validated as well as timed.

All of the above testing categories are typically accomplished in two ways, (1) a programmatic test case that drives a user interface or another programmable interface and checks results; and (2) a manual (or semi-manual) process a tester follows, which typically involves running certain tools that test or verify a result or simply executing a series of steps and verifications.

The environment allows for tracking testing.

Figure 2:
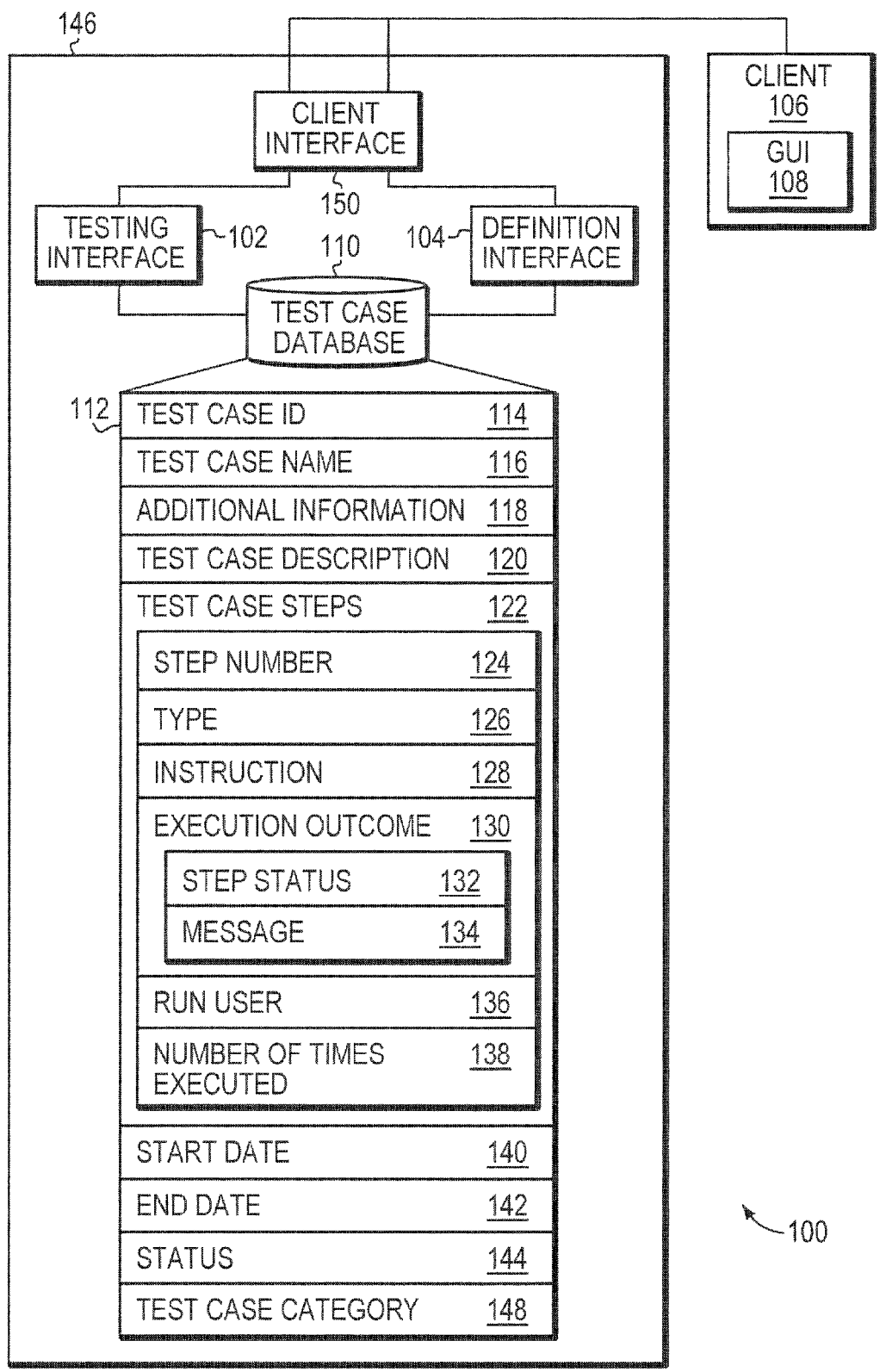

FIG. 2 is an architecture diagram depicting a system 100 for use in managing software testing. The system 100 has a server 146 (residing within a LAN 54 or WAN 58 of FIG. 1 for example) for collecting, storing, and distributing information related to the testing process and a client 106 (such as the computer 12 or the remote computer 56 of FIG. 1) through which test information data may be added, edited and viewed. The client 106 has a graphical user interface (GUI) 108, shown in FIG. 3, through which a user can interact with testing data on the server 146.

The server 146 has a client interface 150 in communication with the client 106 for receiving information from and sending information to the client 106. The client interface 150 is in communication with two interfaces 102, 104 (also termed interface means, interaction means or step interaction means depending on precise functions performed as discussed below) that interface with a test case database 110. The client interface 150 provides the appropriate interface 102, 104 with information form the client 106. The interfaces 102, 104 communicate the client interface 150 to forward information to the client 106. The client interface 150 detects a request to create an entry in the database 110 representing a test case and invokes a definition interface 104. During creation of an entry in the database 110 all information received by the client interface 150 is forwarded to the definition interface 104. When sufficient information to create an entry in the database 110 has been received, the definition interface 104 informs the client interface 150 that creation is complete. Any subsequent information received by the client interface 150 that is not tagged as definition information is forwarded to a testing interface 102. The definition interface 104 and the client interface 102 service client 106 requests to view and manipulate the testing information in the test case database 110.

The definition interface 104 is an interface through which at least some test cases may be created. The definition interface 104 provides the GUI 108 with an indication of the information needed to create an entry in the database 110 representing a test case in response to a request from the client

106. The definition interface 104 accepts this information from the client 106 and confirms that it is sufficient to create an entry in the database 110.

The database 110 contains test case definition 112 entries that define a test case designed to verify an aspect of a system. The test cases are steps that are performed in a specified manner to test the system. These steps form a test instruction set 122 in the test case definition 112 in the database 110. The individual elements in the test instruction set 122 are instruction steps (e.g., CLI commands). Each instruction step may have execution status information 130 representing the status of each step after execution.

Creating a test case definition 112 involves setting a test category 148 (e.g., automatic or manual test), a name 116, a description of the test case 120 (e.g., including keywords and mapping to features) and defining the steps of the test case 122. For each instruction step in a test case definition 112 there is a step number 124 for ordering steps according to relative execution times, a step type 126 and the instructions to be executed for the step 128. The step type 126 indicates the purpose of each step. The definition interface 104 accepts information that defines a new test case and creates the test case definition 112 in the test case database 110 using the information provided by the client 106.

The testing interface 102 accesses a test case definition 112 from the database 110 in response to a request from the client 106 to view the test case definition 112. In response to the request from the client 106 to view or edit a test case, the testing interface 102 retrieves the stored information from the database 110 and formats it for display on the client 106. The testing interface 102 will accept or indicate changes in status, number of times each step was executed 138 and user that executed the step 136 as well as messages that may be associated with each instruction step. Editorial changes may also be made to the instruction 128 of each instruction step in the database 110 through the testing interface 102 These editorial changes may include changing a step or adding a new step.

Figure 3:
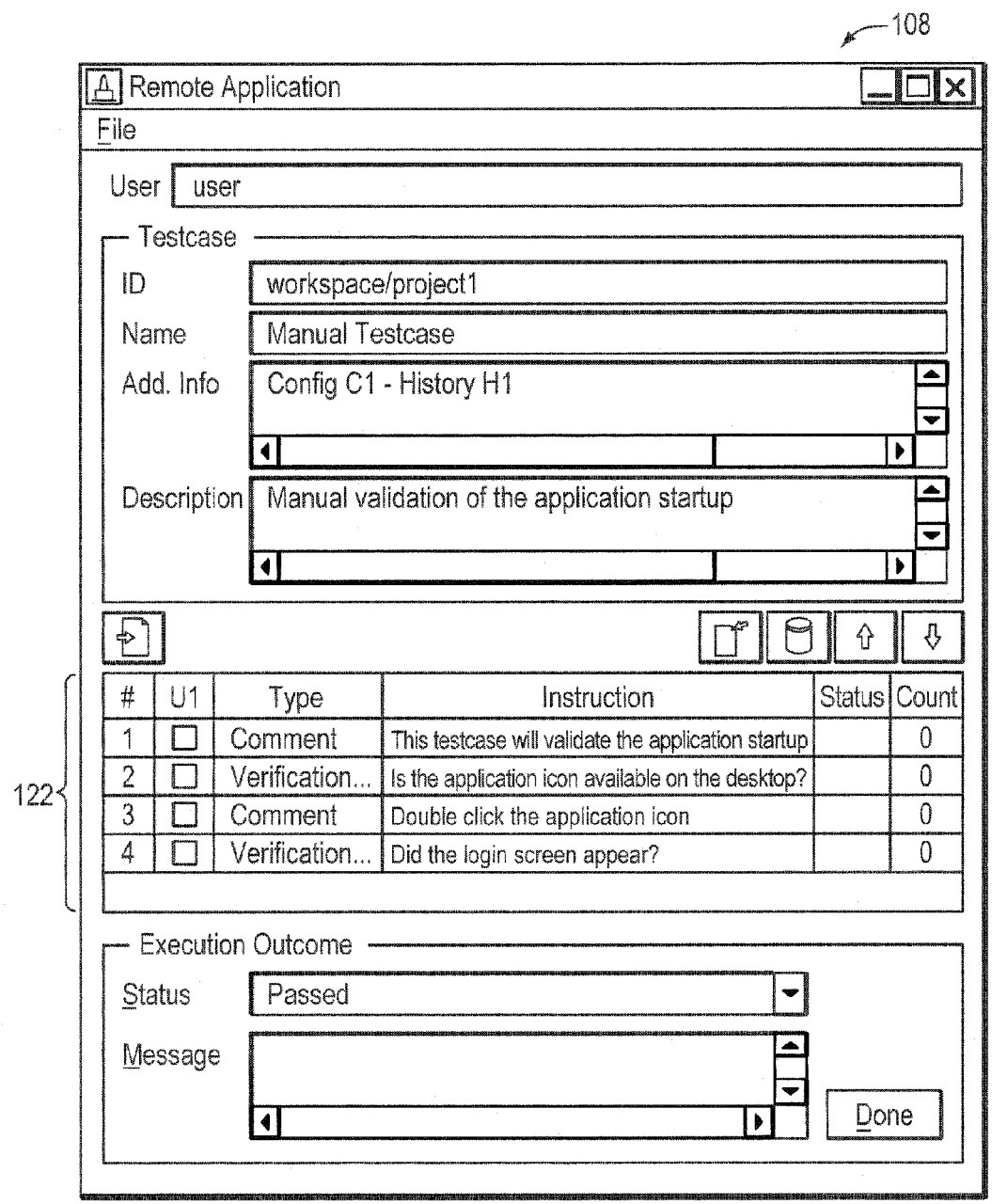
FIG. 3 is an illustration of a graphical user interface screen that may be used with one or more of the techniques described herein.

An exemplary screen shot of the client 106 GUI 108 is shown in FIG. 3 that allows the steps of a test case to be added or edited. The client 106 also allows the status (including status, number of times executed and run user) to be changed and updated. The GUI 108 displays test case definitions 112 from the test case database 110. The test instruction set 122 displayed on the GUI 108 may be viewed and interacted with to change or indicate the status 132 and the execution count 138 for each step as well as add new steps to the test instruction set 122 in the database 110. Additional information regarding the test instruction set 134 and the test case definition 118 may also be added to the database 110 via the GUI 108. A user may view the test instruction set 122 via the GUI 108 to review the test steps. Status 132 for each of these steps may then be added to the test case definition 112 in the database 110 while each step is being performed.

The test case database 110 contains information on a plurality of test cases 112 stored as data structures. Each test case definition 112 has similar descriptive information. Each data structure containing a test case definition 112 is identified by the test case ID 114 identifying what is being tested and the test case name 116. Additional information 118 and the test case description 120 provide a description of the test as well as outline any interfaces that are tested, etc. The test instruction set 122 field of the test case definition 112 contains all steps that define the actions of the test case. Each instruction step has the step number 124 by which it can be defined, the type of step 126 and the instruction action 128 for each step.

Each step also has the execution status information 130 that contains status 132 of the step and may have the associated message 134.

The type of step 106 may be a comment, a verification point or an action. A comment type step defines instructions created to illustrate a concept, provide further information on the subject under test, etc. A verification point step is an instruction created to perform a specific validation for a scenario being executed. An action step is an instruction for an action that is taken in a test.

The instruction steps also include an indication of the entity that executed the step 136 for each step and the number of times the step has been executed 138. Each test case definition 112 further includes a start date 140 when execution of the test case first started and an end date 142 when the test case was successfully competed. Each test case definition 112 also has an overall status 144 and a test case category 148 indicating the type of test (e.g., automatic or manual test). The test case ID 114, test case name 116, additional information 118, test case description 120, test case category 148, step number 124, step type 126, and instruction 128 may all be set when a test case is created. The start date 140, end date 142, status 144, step status 132, execution step message 134, run user 136 and number of times executed 138 are determined during execution of the test case.

The client 106 allows a user to view a test case and provide a series of steps to be executed for the test. The client 106 also allows the status of each step to be set during execution of the test case. The client 106 and the server 146 can be remote from each other, allowing a test case to be viewed, run and the status updated at a different location from the server 146. This provides a user with the ability to cause test cases to be performed from multiple different locations while still monitoring test case status information on the server 146 during execution of the test case.

The test case is created in the test case database 110 through the client 106 via the definition interface 104. Test case ID 114, test case name 116, test case category 148 and test case steps 122 are entered into the GUI 108 of the client 106 to provide the basic definition for the test case. The test case steps 122 include for each step the step number 124, step type 126 and the instruction 128. This information is supplied to the definition interface 104 where a test case definition 112 is created in the database 110 based on this information. Additional information 118 and test case description 120 information may be optionally included during the creation of the test case definition 112 in the database 110.

The test case may be viewed and edited by the client 106 via the testing interface 102. The GUI 108 receives a request to view a test case from a user. This request is sent from the client 106 to the testing interface 102 of the server 146. The testing interface 102 retrieves the requested test case from the database 110. This information is formatted and sent to the client 106 for display by the GUI 108, test case step instructions 128 may be displayed on the GUI 108 allowing each step to be viewed. As each test case step 122 is executed information on execution outcome 130, run user 136 and number of times executed 138 are gathered by the client 106.

This information is passed to the testing interface 102 to update this information in the database 110. After a test case step 122 is executed updated status information 132 is entered and may be viewed on the GUI 108. Message information may be added in correspondence with the status of each test case step 122. The client 106 automatically gathers run user information 136 and the number of times the test case step has been executed 138 during interaction with the test case information.

The client 106 supplies the testing interface 102 with execution date information of any changes to status of the steps 122 of the test case. The testing interface 102 can compare this date information with the start date 140 and the end date 142 of the test case.

This allows the testing interface 102 to set the start date 140 with the currently supplied execution date if not yet set. After updating the step status 132 for steps 122 according to information provided by the client 106, the testing interface 106 examines the status of all steps 122 in the test case definition 112. If all steps 122 have a passed or completed status then the status 144 of the test case definition 112 is set to passed or completed and the end date 142 is set to the current execution date supplied by the client 106.

In an embodiment the system 100 includes the following:
(a) a GUI that has support to show a test case name and description;
(b) a grid that contains the sequence of steps to be executed;
(c) a mechanism to submit state changes to the central system;
(d) a facility for ad hoc comments to be made regarding each step; and
(e) a mechanism to add steps to a script.

Each step from (b) has an associated status. This is generally configurable to a fixed set of choices and has a default state of "un-attempted".

In practice, the GUI is fed a string for the name, a string for the description, a set of sequences for the steps, and a set of sequences for the possible states with one identified as the default. A separate process is implemented to reconcile items (a)-(d) with an initial test case structure. With respect to step (e), it is common to modify the scripts on an ad-hoc basis. As a result, recording them immediately at test execution time minimizes the risk of losing valuable information. As a final step, the system receives an input string as an XML fragment and submits an X fragment when reporting status. The GUI is part of a client that is capable of running remote from a server containing a database with test case information.

In a specific embodiment, since the system is effectively a running application, it can be used to integrate a manual test process step into another automated process system. More specifically, the test automation system simply runs an application as a step in the overall process; the application being a program that interacts with one or more local or remote testers accumulating results in a central system.

The client may run on the machine being used to do the testing. Alternatively, it can be implemented on a wireless device or an alternate machine. Further, the client can be implemented using Java, for example, or any other U' metaphor or language (e.g., XSL in a browser).

In another embodiment, the client 106 may include the testing interface 102 and the definition interface 104 and the client interface 150. The testing interface 102 and the definition interface 104 are linked to the database 110.

Alternatively, the client interface 105, the testing interface 102 and the definition interface 104 may connect the database 110 and the client 106 but be remote from both.

The client interface 150, the testing interface 102, and the definition interface 104 may interface with a plurality of clients.

Figure 4:
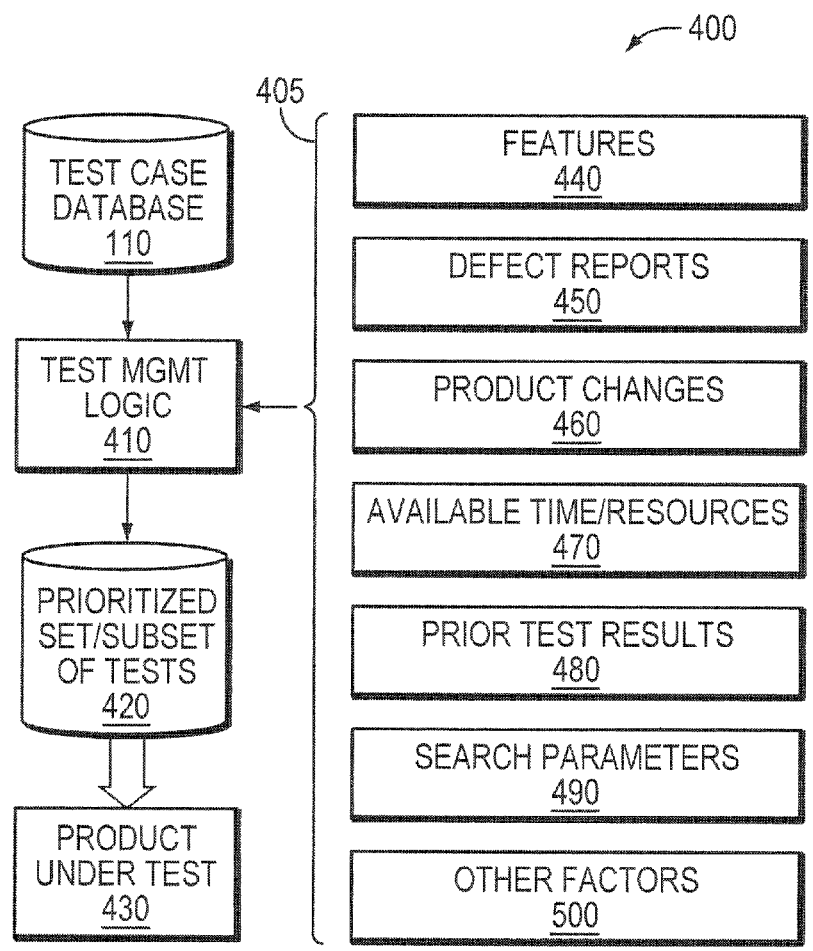

With respect to use of database 110, FIG. 4 illustrates an example implementation 400 based on the technique, in which test management logic 410 is applied to database 110 (with its definitions 112) to produce a prioritized set/subset of tests 420 which can be applied to product under test 430. As described by example in more detail below, logic 410 operates based on one or more factors or sets of factors which, depending on the implementation, may include database 110 and/or additional factors 405 including product features 440, defect reports 450, product changes 460, available time/resources 470, prior test results 480, search parameters 490 including search terms, and/or other factors 500.

In at least one embodiment based on implementation 400 as now described, the selection of tests from database 110 for regression testing is automatic and is based on a test relevance calculated by a test analyzer of logic 410, and test cases of database 110 that do not cover code changes are rotated to help ensure a full cycle with all tests.

An artifact tracking system (such as SourceForge or BugZilla) is used and is integrated with a version control system (such as Subversion or CVS). The tracking system enables interfaces with the test analyzer (APIs for SourceForge or database tables for BugZilla).

In the tracking system, each feature (and each of its sub features, if any) is associated with one or more artifacts. As shown in the example below, if a features has sub features, an according weight is assigned for it and the sum of all sub features' weights within one feature or sub feature is equal to 100%. A weight is set up in accordance with feature priority and complexity.

| Software | |
|---|---|
| \|- Feature_0 | |
| \| \|- Sub_Feature_0 | 40% |
| \| \|- Sub_Feature_1 | 60% |
| \| \|- Sub_subFeature_0 | 70% |
| \| \|- Sub_subFeature_1 | 30% |
| \|- Feature_1 | |
| \|- Sub_Feature_2 | 65% |
| \|- Sub_Feature_3 | 35% |

For example, in a data storage system context, Feature_0 may relate to provisioning, Sub_Feature_0 to generic storage provisioning, Sub_Feature_1 to shared folder provisioning, Sub_subFeature_0 to creating a new shared folder, Sub_subFeature_1 to creating a snapshot of the new shared folder, Feature_1 to capacity reporting, Sub_Feature_2 to a pie chart, and Sub_Feature_3 to pool view. When defect reports 450 and/or product changes 460 are submitted, these may be reported as pertaining to one or more of these features or subfeatures.

Each feature in the tracking system is characterized in the test analyzer with sets of keywords, regular expressions, and/or CLI commands (or other kinds of user interface commands).

The test analyzer parses a test each time it is changed or a new feature is added and creates the traceability for each test and all features.

As shown by example below, each value represents feature coverage by test based on the test analyzer's comparison with sets of keywords, regular expressions, and/or CLI commands (e.g., using a search engine and search parameters 490).

| Test_0: | 10 |
|---|---|
| - Sub_Feature_0: | 10% |
| - Sub_Feature_1: | 40% |
| - Sub_subFeature_0 | 5% |

When a developer commits the developer's code to the version control system, the developer associates changes with artifacts, and those artifacts are associated with features or with tests within the tracking system. Later the test analyzer searches all code commits and create a list of artifacts to test during the test cycle.

Before the test cycle starts, a list of the most suitable tests is produced. The measure of test suitability is relevance, which is defined as a number (0.0%-100.0%) and indicates the extent to which changes made by developers are covered in each test.

All tests' relevancies are saved in a database or matrix in which each value indicates test relevance for the according artifact.

A list of regression tests can be affected when a new feature is implemented and when an issue (e.g., defect) is fixed.

If new feature is implemented, the test analyzer sets the relevance for a test in accordance with the feature coverage in the test.

For example, if a new feature called "Sub_Feature_1" is implemented, the test analyzer may set the relevance to 40% for test "Test_0" (see above).

If any issue is fixed, the test analyzer finds each failed test corresponding to the issue and the artifact in the list of tests and set the test's relevance to 100%, as shown in the following example.

| Test_1: | | - Test relevance is 100%. |
|---|---|---|
| - Sub_Feature_1: | 10% | |
| - Sub_Feature_2: | 40% | |

The test analyzer also remembers the list of features affected by the test and normalizes the sum to 100% to define how many actions in the test cover each feature. For "Test_1" above the normalized values are 20% and 80% accordingly.

The test analyzer then sets relevancies for all other tests. If another test also covers the features used in the failed test, the maximum feature coverage in the current test multiplied by the normalized feature coverage in the failed test is used as relevance for this test.

For example, the test analyzer may find the following for "Test_2":

| Test_2: | |
|---|---|
| - Sub_Feature_0: | 60% |
| - Sub_subFeature_0: | 10% |
| - Sub_Feature_2: | 10% |

If in the test sub features are covered for the feature in the failed test, their coverage indexes are traced to the parent features; in the example above "Sub_subFeature_0" is a sub feature for "Sub_Feature_1". "Sub_subFeature_0" covers 70% of "Sub_Feature_1" (see above) and it is 10% covered in the test "Test_2". It means that total "Sub_Feature_1" coverage in "Test_2' is 7% (70% of 10%) and test relevance for this feature is also 7%. Test relevance for "Sub_Feature_2" is 10%.

The test relevancies for features are multiplied by the corresponding values from the failed test. In this case they are 20% for "Sub_Feature_1" and 80% for "Sub_Feature_2". And the resultant relevancies for the test are 1.4% for "Sub_subFeature_0" (20% of 7%) and 8% for "Sub_Feature_2" (80% of 10%).

The test analyzer normalizes these values to 100%. For example, the normalized test values for "Test_2" are as follows:

| Test_2: | |
|---|---|
| - Sub_Feature_0: | 86.45% |
| - Sub_Feature_1 | 2.03% |
| (previously Sub_subFeature_0): | |
| - Sub_Feature_2: | 11.52% |

As the final test relevance the maximum value is selected in accordance with list of features affected by the failed test. In the example they are "Sub_Feature_1" and "Sub_Feature_2" and the test relevance is 11.52%.

If needed, the features covered in the tests and not covered in the failed test can also be added to the list of affected features, but in this case the normalized value for them should be multiplied by the test relevance and a coefficient that reflects the allowance of feature use in the list of affected features and it is set up globally.

For example, if "Sub_Feature_0" is also added to the list of features affected in the failed test, the normalized relevance for this feature is calculated as follows:

$$\frac{86.45 \cdot 11.52}{100} \cdot k,$$

where 'k' is feature reuse coefficient (see above).

When test analyzer finishes setting up the relevancies for the tests in its database of matrix tables, it consolidates the results for each test and normalizes them.

The following is a sample list of test relevancies in accordance with artifacts:

|  | artf0000 | artf0001 | artf0002 |
|---|---|---|---|
| Test_0 | 40.0 | 50.0 | 0.0 |
| Test_1 | 0.0 | 100.0 | 40.0 |
| Test_2 | 100.0 | 11.5 | 10.0 |
| Test_3 | 0.0 | 0.0 | 0.0 |
| Test_4 | 50.0 | 50.0 | 50.0 |
| Test_5 | 30.0 | 70.0 | 10.0 |
| Test_6 | 0.0 | 80.0 | 0.0 |
| Test_7 | 0.0 | 59.9 | 78.2 |

The test analyzer then finds the sums for each column to calculate the total artifact impact on the list of tests:

|  | artf0000 | artf0001 | artf0002 |
|---|---|---|---|
| Test_0 | 40.0 | 50.0 | 0.0 |
| Test_1 | 0.0 | 100.0 | 40.0 |
| Test_2 | 100.0 | 11.5 | 10.0 |
| Test_3 | 0.0 | 0.0 | 0.0 |
| Test_4 | 50.0 | 50.0 | 50.0 |
| Test_5 | 30.0 | 70.0 | 10.0 |
| Test_6 | 0.0 | 80.0 | 0.0 |
| Test_7 | 0.0 | 59.9 | 78.2 |
| SUM: | 220.0 | 421.5 | 188.2 |

It can be seen that "artf0001" has the biggest impact on the tests. The same procedure can be done for the tests row, but before that the tests' values are multiplied by the total artifact impact:

|       | artf0000 | artf0001 | artf0002 |
|-------|----------|----------|----------|
| Test_0 | 8800.0  | 21072.6  | 0.0      |
| Test_1 | 0.0     | 42145.1  | 7528.2   |
| Test_2 | 22000.0 | 4855.1   | 1882.1   |
| Test_3 | 0.0     | 0.0      | 0.0      |
| Test_4 | 11000.0 | 21072.6  | 9410.3   |
| Test_5 | 6600.0  | 29501.6  | 1882.1   |
| Test_6 | 0.0     | 33716.1  | 0.0      |
| Test_7 | 0.0     | 25258.1  | 14718.7  |

The total test relevance is calculated and normalized:

|       | artf0000 | artf0001 | artf0002 | SUM:    | MAX:    | Relevance: |
|-------|----------|----------|----------|---------|---------|------------|
| Test_0 | 8800.0  | 21072.6  | 0.0      | 29872.6 | 49673.3 | 60.1%      |
| Test_1 | 0.0     | 42145.1  | 7528.2   | 49673.3 |         | 100.0%     |
| Test_2 | 22000.0 | 4855.1   | 1882.1   | 28737.2 |         | 57.9%      |
| Test_3 | 0.0     | 0.0      | 0.0      | 0.0     |         | 0.0%       |
| Test_4 | 11000.0 | 21072.6  | 9410.3   | 41482.8 |         | 83.5%      |
| Test_5 | 6600.0  | 29501.6  | 1882.1   | 37983.6 |         | 76.5%      |
| Test_6 | 0.0     | 33716.1  | 0.0      | 33716.1 |         | 67.9%      |
| Test_7 | 0.0     | 25258.1  | 14718.7  | 39976.8 |         | 80.5%      |

In the table above, the "SUM" column contains sum of the row values for each test; the "MAX" column contains the maximum value from the "SUM" column and used to normalize the values from the "SUM" column to 100%; and the "Relevance" column contains the total tests relevancies that are used to create the list of tests.

Thus the tests may be prioritized by relevance:

|       | Relevance: |
|-------|------------|
| Test_1 | 100.0%    |
| Test_4 | 83.5%     |
| Test_7 | 80.5%     |
| Test_5 | 76.5%     |
| Test_6 | 67.9%     |
| Test_0 | 60.1%     |
| Test_2 | 57.9%     |
| Test_3 | 0.0%      |

Thus in this example the prioritized set/subset of tests 420 may specify performing "Test_1" first, "Test_4" second, and so on.

Other factors may be used as well by logic 410 to help determine the prioritized set/subset of tests 420. For example, depending on available time/resources 470, "Test_3" may be left out completely since its relevance is 0.0. Tests may be included or excluded depending on a perceived return on investment with respect to available time/resources 470, so that, for example, where time is of the essence, an only moderately relevant test may included anyway if it is very quick to completion.

In another example, all features and requirements are stored in the system, available via APIs, and have IDs. In case of using SourceForge, each feature and requirement can be associated with an artifact. If a feature has sub-features, appropriate weights are assigned for the sub-features and the sum of all sub-features' weights within one feature or sub-feature equals 100%. For example, a "LUN_Trespass" feature in a feature tree illustrated in FIG. 5 has three sub-features with different weights, and the sum of these weights is 100%. These weights can be set up manually or automatically (for example, the formula (100/<num_of_subfeatures>) or a complex code analyzer may be used).

The meaning of the weight is to show the sub-feature priority and complexity within the feature to focus the test team on the specific corresponding areas.

Each feature and sub-feature also has a respective set of keywords/CLI commands/regular expressions that describe the feature or sub-feature and are used by the test analyzer to define how the particular test case tests the feature or sub-feature.

For example, as shown in FIG. 5, a "Trespass" feature (artf1006) has "trespass" in keywords, "tr, trespass" in the CLI commands and "/\s*(tr|trespass)\s+\d+/gi" in regular expressions.

The test analyzer is executed each time a test is changed or a new feature is added. It creates traceability between each test and all features based on test keywords (column "Keywords" below) and its content.

| ID      | Title                                                                                                                                      | Keywords                                |
|---------|--------------------------------------------------------------------------------------------------------------------------------------------|-----------------------------------------|
| artf3001 | Bind_01: Test that RAID-6 group having drive width of 6 can be created.                                                                   | bind, raid-6                            |
| artf3002 | Bind_02: Test that LUNs in RAID-6 group can be unbound successfully.                                                                       | bind, unbind, raid-6                    |
| artf3003 | Shutdown_01: Test that if two drives are pulled in a RAID-5 group, the LUNs go broken. Test with I/O.                                      | I/O, remove drive, insert drive, raid-5 |
| artf3004 | BG_Processes_01: Test that after unbinding a LUN that is background verifying, sniff verify resumes from the last checkpoint in the RAID group. | bind, zeroing, sniffing, verify, remove group |

For parsing, the test analyzer uses the feature's list of keywords, CLI commands and regular expressions. When the test analyzer is finished, each test has traceability between itself and features/requirements.

For example, test "Bind_02" (artf3002) appears as follows, wherein each value represents corresponding feature coverage in the test:

| Bind 02:   |          |     |
|------------|----------|-----|
| LUN_Unbind | artf1004 | 80% |
| Bind       | artf1003 | 40% |
| Fast_Bind  | artf1002 | 10% |

When a developer commits the developer's code to the version control system, the developer associate the developer's changes with the artifacts, and those artifacts are associated with new features or with defects within the tracking system.

Two use cases are discussed below:
1. New feature is implemented and committed;
2. Bug fix is committed.

Each bug in the artifact tracking system has a reference to its corresponding failed test and is used by the test analyzer when creating the list of regression tests.

Before the test cycle startup a list of the most suitable tests is selected. In this example, the measure of the test's suitability is referred to as "test relevance", which is defined as a number (0%-100%) and indicates the extent to which changes made by developers are covered in the test.

All tests' relevancies are saved in a database.

With reference again to the use cases:

1. If a new feature is implemented, the test analyzer sets the relevance for the test in accordance with the feature coverage in the test.

For example, the new feature "Bind" (artf1003) is implemented and the test analyzer sets its relevance to 40% for the "Bind_02" (artf3002) test case (see above).

2. If a bug is fixed, the test analyzer finds the test failed by the artifact in a list of tests (each bug has a reference to the corresponding test that failed) and set its relevance to 100%. For example, the test "Bind_02" (artf3002, see below) failed and "artf5019" was submitted. This means that this test's relevance for this fix is 100%.

| ID | Title | Result | Date of execution | Estimated runtime minutes | Artifact num |
|---|---|---|---|---|---|
| artf3001 | Bind_01: Test that RAID-6 group having drive width of 6 can be created. | Pass | 1 Jun. 2009 | 30 | |
| artf3002 | Bind_02: Test that LUNs in RAID-6 group can be unbound successfully. | Fail | 21 Feb. 2009 | 40 | artf5019 |
| artf3003 | Shutdown_01: Test that if two drives are pulled in a RAID-5 group, the LUNs go broken. Test with I/O. | Pass | 12 May 2009 | 35 | |
| artf3004 | BG_Processes_01: Test that after unbinding a LUN that is background verifying, sniff verify resumes from the last checkpoint in the RAID group. | | | | |

When the initial relevancies are set, the test analyzer checks all other tests and sets the appropriate relevancies for them.

With reference again to the "Bind_02" test case with 100% relevance to "artf5019", the "LUN_Unbind" and the "Fast_Bind" features are also checked, which means that they are affected by the code changes introduced in the current build and are also to be tested.

First, the test analyzer normalizes the features relevancies in this test to 100% to define how many actions in the test cover each feature. In this case the different test cases can be compared:

| Bind_02: | | |
|---|---|---|
| LUN_Unbind | artf1004 | 61% |
| Bind | artf1003 | 31% |
| Fast_Bind | artf1002 | 8% |

After that the test analyzer sets relevancies for all other tests.

If features used in the test affected in the current build present in another test, the feature coverage in the current test is multiplied by the normalized value from the original test. For example, "BG_Processes_01" (artf3004) has the following coverage, which is calculated by the test analyzer:

| BG_Processes_01: | | | Total coverage: |
|---|---|---|---|
| LUN_Unbind | artf1004 | 60% | 61% · 60% ≈ 37% |
| Bind | artf1003 | 25% | 25% · 31% ≈ 8% |
| BG_Verify | artf1010 | 30% | 30% |
| Sniffing | artf1012 | 35% | 35% |

The test may cover sub-features for the features from the original test. For example, the "LUN_Unbind" feature may contain sub-features "Wipe" (40%) and "Quick_unbind" (60%) and the "Shutdown_01" test case covers 25% of the "Wipe" sub-feature. In this case, the total coverage for the "LUN_Unbind" feature in the "Shutdown_01" test case is 25%·40%=10%.

When the total coverage is calculated for each test, there two possible use cases:

1. It is not necessary to add non-affected features to the list of affected features.

In this case the total coverage values are normalized for each test and the maximum value of the affected features is the total test relevance:

| BG_Processes_01: | | | Total coverage: | Normalized: |
|---|---|---|---|---|
| LUN_Unbind | artf1004 | 60% | 61% · 60% ≈ 37% | 34% (test relevance) |
| Bind | artf1003 | 25% | 25% · 31% ≈ 8% | 7% |
| BG_Verify | artf1010 | 30% | 30% | 27% |
| Sniffing | artf1012 | 35% | 35% | 32% |

2. It is necessary to add non-affected features to the list of affected features.

In this case the additional list of features is created. Then, the total coverage values are normalized, and the non-affected features' values are multiplied by the possible test relevance:

| BG_Processes_01: | | | Total coverage: | Normalized: | New feature relevance: |
|---|---|---|---|---|---|
| LUN_Unbind | artf1004 | 60% | 61% · 60% ≈ 37% | 34% (test relevance) | |
| Bind | artf1003 | 25% | 25% · 31% ≈ 8% | 7% | |
| BG_Verify | artf1010 | 30% | 30% | 27% | 27% · 4% ≈ 9% |
| Sniffing | artf1012 | 35% | 35% | 32% | 32% · 34% ≈ 11% |

At this point, these values are multiplied again by the feature-reuse coefficient, which is set up globally. The resulting formula is the following:

$$\frac{<feature\_to\_include> \cdot <test\_relevance>}{100\%} \cdot k;$$

wherein is the feature-reuse coefficient.

When all relevancies for the new features are calculated, the maximum relevance is taken for each feature and stored in the additional list of the affected features. Then all tests' total coverage values are re-calculated using the values stored and then normalized. For example, here is the original list of build-affected features and the additional one:

| Original list (normalized values): | | |
|---|---|---|
| LUN_Unbind | artf1004 | 61% |
| Bind | artf1003 | 31% |
| Fast_Bind | artf1002 | 8% |

| Additional list (values are not normalized): | | |
|---|---|---|
| BG_Verify | artf1010 | 15% |
| Sniffing | artf1012 | 19% |

When the additional list is created, the new values are calculated for each test:

| BG_Processes_01: | | | Total coverage: | Normalized: |
|---|---|---|---|---|
| LUN_Unbind | artf1004 | 60% | 61% · 60% ≈ 37% | 65% (test relevance) |
| Bind | artf1003 | 25% | 25% · 31% ≈ 8% | 14% |
| BG_Verify | artf1010 | 30% | 30% · 15% ≈ 5% | 9% |
| Sniffing | artf1012 | 35% | 35% · 19% ≈ 7% | 12% |

When the test analyzer finishes setting up the test relevancies, it consolidates the results for each test/artifact in the build and normalizes them.

For example, in the current build "artf5019" was fixed and new feature "artf1012" ("Sniffing") was added. The resulting table is as follows:

| | artf5019 | artf1012 |
|---|---|---|
| Bind_01 | 20% | 4% |
| Bind_02 | 100% | 2% |
| Shutdown_01 | 5% | 33% |
| BG_Processes_01 | 65% | 100% |

At this point, the test analyzer finds the sums for each column to calculate the total artifact impact on the list of tests:

| | artf5019 | artf1012 |
|---|---|---|
| Bind_01 | 20 | 4 |
| Bind_02 | 100 | 2 |
| Shutdown_01 | 5 | 33 |
| BG_Processes_01 | 65 | 100 |
| SUM: | 190 | 139 |

It is determined, as is apparent, that "artf5019" has the biggest impact on the tests. The same procedure is done for the tests row to find out the tests impact, but before that the tests' values are multiplied by the total artifact impact:

| | artf5019 | artf1012 |
|---|---|---|
| Bind_01 | 20 | 4 |
| Bind_02 | 100 | 2 |
| Shutdown_01 | 5 | 33 |
| BG_Processes_01 | 65 | 100 |
| SUM: | 190 | 139 |

==>

| | artf5019 | artf1012 |
|---|---|---|
| Bind_01 | 3800 | 556 |
| Bind_02 | 19000 | 278 |
| Shutdown_01 | 950 | 4587 |
| BG_Processes_01 | 12350 | 13900 |
| SUM: | 190 | 139 |

At this point, the total test relevance is calculated and normalized:

| | artf5019 | artf1012 | SUM | MAX | Relevance |
|---|---|---|---|---|---|
| Bind_01 | 3800 | 556 | 4356 | 26250 | 16.6% |
| Bind_02 | 19000 | 278 | 19278 | | 73.4% |
| Shutdown_01 | 950 | 4587 | 5537 | | 21.1% |
| BG_Processes_01 | 12350 | 13900 | 26250 | | 100.0% |

The "SUM column contains the sum of the row values for each test. The "MAX" column contains the maximum value from the "SUM" column and used to normalize the values from the "SUM" column to 100%;

The "Relevance" column contains the total tests' relevancies that are used to create the regression test suite.

The tests with 100% initial relevance are run in this test cycle in any case ("Bind_02" and "BG_Processes_01").

Then other test cases are selected based on their relevancies (the lowest relevance boundary for reuse can be defined), the estimated runtime minutes, priority, type, as shown below.

| ID | Title | Description |
|---|---|---|
| artf3001 | Bind_01: Test that RAID-6 group having drive width of 6 can be created. | 1. Create a RAID-6 group of width 6.<br>2. Bind a LUN in the newly created RAID group on any SP with any LUN size. |
| artf3002 | Bind_02: Test that LUNs in RAID-6 group can be unbound successfully. | 1. Unbind LUNs in the RAID-6 group.<br>2. Rebind the LUNs to get back the initial configuration. |
| artf3003 | Shutdown_01: Test that if two drives are pulled in a RAID-5 group, the LUNs go broken. Test with I/O. | 1. Start I/O to all LUNs.<br>2. Remove any 2 drives from the RAID-5 group.<br>3. Reinsert the removed drives and wait for the LUNs to rebuild. |
| artf3004 | BG_Processes_01: Test that after unbinding a LUN that is background verifying, sniff verify resumes from the last checkpoint in the RAID group. | 1. Create RAID-6 group, bind a couple of LUNs to it and wait for BG zeroing to complete.<br>2. Initiate sniff verify on the RG.<br>3. Initiate BG verify to one LUN and unbind it.<br>4. Remove the RAID group when finished. |

| ID | Expected behavior | Result | Date of execution | Priority | Estimated runtime minutes | Type | Artifact num | Keywords |
|---|---|---|---|---|---|---|---|---|
| artf3001 | (2) The LUN is successfully bound. | Pass | 1 Jun. 2009 | 1 - High | 30 | Functional | | bind, raid-6 |
| artf3002 | (1) The LUNs are unbound successfully. (2) The LUNs are bound successfully. | Fail | 21 Feb. 2009 | 2 - Medium | 40 | Functional | artf5019 | bind, unbind, raid-6 |
| artf3003 | (2) System does not panic. (2) The LUNs go broken. | Pass | 12 May 2009 | 3 - Low | 35 | Negative | | I/O, remove drive, insert drive, raid-5 |
| artf3004 | (3) Sniff verify halts. (4) BG verify halts and sniff verify continues from the last checkpoint. | | | 2 - Medium | | Functional | | bind, zeroing, sniffing, verify, remove group |

Accordingly, the technique may be used to focus quality testing and use quality testing more efficiently, which can improve quality by allowing for more effective and more frequent testing. The technique may also be used to manage quality testing when non-software changes or additions (e.g., pertaining to non-software components) are made to a system.

An embodiment may implement the technique herein using code executed by a computer processor. For example, an embodiment may implement the technique herein using code which is executed by a processor of the data storage system and/or host. As will be appreciated by those skilled in the art, the code may be stored on the data storage system, host or other component on any one of a computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by the processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing quality testing, the method comprising:
    mapping quality test cases to characteristics of a product under test on a data storage system, wherein each of the quality test cases includes a set of steps performed for testing the characteristics of the product under test, wherein each of the characteristics of the product under test is associated with a quality test case and assigned a weight, wherein a characteristic of the product under test includes a set of features, wherein a weight assigned to each feature of the product under test is based on a priority of a feature and a complexity of the feature;
    associating changes to source code of the product under test with artifacts, wherein the changes to the source code include fixing a defect in the product under test and adding a new feature in the product under test, wherein an artifact includes a quality test case, wherein the artifacts are mapped to the changes to source code of the product under test by associating a failed quality test case related to the defect in the product under test with the changes to source code related to fixing the defect and associating a quality test case related to the new feature added in the product under test with the new feature;
    creating a list of quality test cases for testing based on the changes to source code of the product under test;
    based on the mapping and a result of a previously executed quality test case on the data storage system, determining a respective relevance level for each of the quality test cases of the list of quality test cases, wherein the respective relevance level for each of the quality test cases of the list of quality test cases indicates an extent to which a change in the source code of the product under test is covered by each of the quality test cases of the list of quality test cases, wherein the result indicates a failure of the previously executed quality test case, wherein the respective relevance level for the failed previously executed quality test case is determined based on a type of the change in the source code of the product under test; and
    based on the relevance levels for the quality test cases of the list of quality test cases, determining a priority among the quality test cases of the list of quality test cases.

2. The method of claim 1, further comprising:
    based on the quality test cases, performing regression testing of a software product.

3. The method of claim 1, further comprising:
    based on the priority among the quality test cases, selecting quality test cases for daily regression execution to improve the utility of nightly quality tests.

4. The method of claim 1, further comprising:
    based on a priority of characteristics of an evolving software product, verifying aspects of the evolving software product.

5. The method of claim 1, further comprising:
    based on the priority among the quality test cases, selecting quality test cases for daily testing.

6. The method of claim 1, further comprising:
    basing the determination of the respective relevance level for each of the quality test cases on grouping the quality test cases by features.

7. The method of claim 1, further comprising:
    basing the determination of the respective relevance level for each of the quality test cases on analyzing code of test scripts of the quality test cases.

8. The method of claim 1, further comprising:
    basing the determination of the respective relevance level for each of the quality test cases on assigning development changes with artifacts.

9. The method of claim 1, further comprising:
    basing the determination of the respective relevance level for each of the quality test cases on an analysis of scripts of quality test cases, wherein the scripts are based on mapping command line interface (CLI) syntax to features of the product under test.

10. A system for use in managing quality testing, the system comprising a data storage system, wherein the data storage system includes a processor and a non-transitory computer-readable storage medium;
    first logic mapping quality test cases to characteristics of a product under test, wherein each of the quality test cases includes a set of steps performed for testing the characteristics of the product under test, wherein each of the characteristics of the product under test is associated with a quality test case and assigned a weight, wherein a characteristic of the product under test includes a set of features, wherein a weight assigned to each feature of the product under test is based on a priority of a feature and a complexity of the feature;
    second logic associating changes to source code of the product under test with artifacts, wherein the changes to the source code include fixing a defect in the product under test and adding a new feature in the product under test, wherein an artifact includes a quality test case, wherein the artifacts are mapped to the changes to source code of the product under test by associating a failed quality test case related to the defect in the product under test with the changes to source code related to fixing the defect and associating a quality test case related to the new feature added in the product under test with the new feature;
    third logic creating a list of quality test cases for testing based on the changes to source code of the product under test;
    fourth logic determining, based on the mapping and a result of a previously executed quality test case on the data storage system, a respective relevance level for each of the quality test cases of the list of quality test cases, wherein the respective relevance level for each of the quality test cases of the list of quality test cases indicates an extent to which a change in the source code of the product under test is covered by each of the quality test cases of the list of quality test cases, wherein the result indicates a failure of the previously executed quality test case, wherein the respective relevance level for the failed previously executed quality test case is determined based on a type of the change in the source code of the product under test; and
    fifth logic determining, based on the relevance levels for the quality test cases of the list of quality test cases, a priority among the quality test cases of the list of quality test cases.

11. The system of claim 10, further comprising:
    sixth logic performing, based on the quality test cases, regression testing of a software product.

12. The system of claim 10, further comprising: sixth logic selecting, based on the priority among the quality test cases, quality test cases for daily regression execution to improve the utility of nightly quality tests.

13. The system of claim 10, further comprising:
sixth logic verifying, based on a priority of characteristics of an evolving software product, aspects of the evolving software product.

14. The system of claim 10, further comprising: sixth logic selecting, based on the priority among the quality test cases, quality test cases for daily testing.

15. The system of claim 10, further comprising:
sixth logic basing the determination of the respective relevance level for each of the quality test cases on grouping the quality test cases by features.

16. The system of claim 10, further comprising:
sixth logic basing the determination of the respective relevance level for each of the quality test cases on analyzing code of test scripts of the quality test cases.

17. The system of claim 10, further comprising:
sixth logic basing the determination of the respective relevance level for each of the quality test cases on assigning development changes with artifacts.

18. The system of claim 10, further comprising:
sixth logic basing the determination of the respective relevance level for each of the quality test cases on an analysis of scripts of quality test cases, wherein the scripts are based on mapping command line interface (CLI) syntax to features of the product under test.

\* \* \* \* \*